Figure 1:
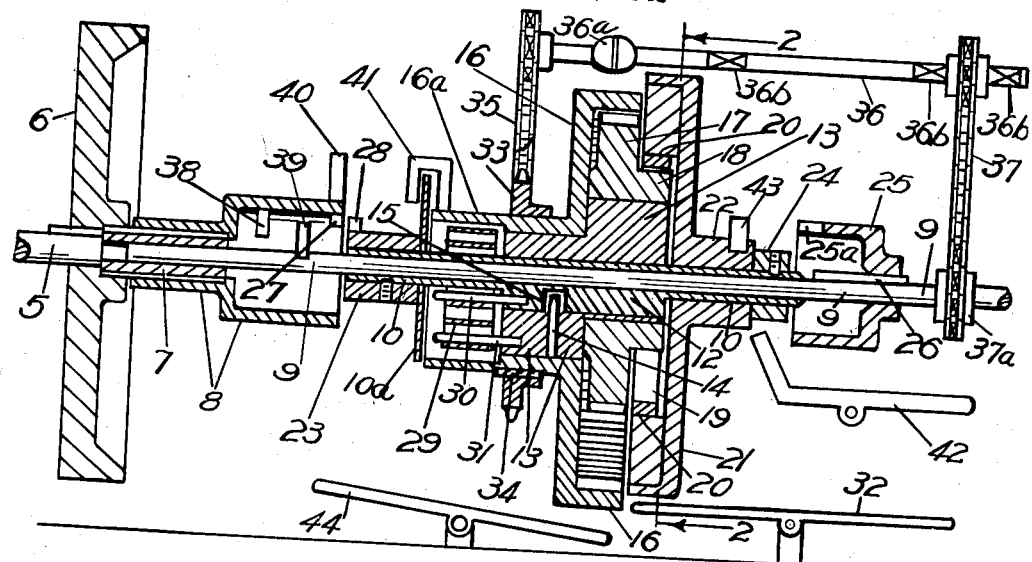

Patented Dec. 30, 1941

2,267,800

UNITED STATES PATENT OFFICE 2,267,800

POWER TRANSMISSION MECHANISM

Francis L. Orr, Denver, Colo., assignor of one-fourth to Modesto P. Ciresi, Denver, Colo.

Application August 23, 1940, Serial No. 353,846

11 Claims. (Cl. 74—259)

This invention relates to improvements in power transmission mechanisms.

As is well known to those skilled in the art, it is highly desirable in transmitting power from certain types of prime movers such as internal combustion motors, to driven elements, to provide transmission mechanism that can be used for changing the power and speed ratio between the prime mover and the driven element.

Therefore, it is a principal object of this invention to provide a novel and improved transmission mechanism of this character which is capable of selective manual control as to its power-transmitting functions and which also is provided with certain automatic features for regulating the various ratios between a prime mover and a driven element.

Figure 2:
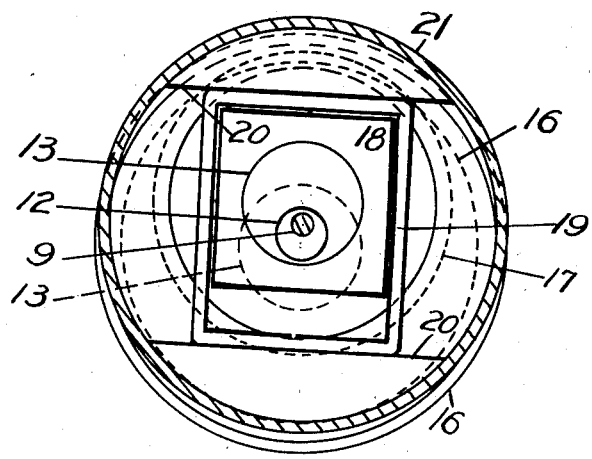

Other objects and advantages reside in details of design and construction which will be more fully disclosed in the following description and in the drawing wherein like parts have been similarly designated and in which:

Figure 1 is a diagrammatic longitudinal sectional illustration of mechanism embodying the present inventive concept; and Figure 2 is a diagrammatic partial sectional view taken along the line 2—2 of Figure 1.

In order to disclose clearly the operating principles of this invention, it will be presented herein diagrammatically since numerous changes would be made in coordinating the embodying mechanism with different elements to be driven. Such a transmission mechanism as the one herein disclosed, could advantageously be used, for instance, in a modern automobile, but its use is in no sense limited to such an environment.

Reference will be had herein to the accompanying drawing but it is to be understood that this presentation is merely a diagrammatic example and it is not to be interpreted or construed as limiting the invention, the scope of which is, in reality, measured by the appended claims.

In the drawing, reference character 5 denotes the shaft of any prime mover which is provided with a fly wheel 6. A splined sleeve 7 is fitted into the hub of the fly wheel 6 and is positively driven thereby. A collar 8 is slidably mounted upon the sleeve 7 to be positively driven thereby, and is axially movable within certain limits relative thereto.

A driven shaft 9 is journalled within the splined sleeve 7 and is positioned concentrically with reference to the shaft 5 and the fly wheel 6, but has no driving connection with said sleeve or fly wheel except as provided through the intermediary of the collar 8 according to the axial position of said collar with reference to the driven shaft 9 and other components hereinafter to be set forth.

A sleeve 10 surrounds the driven shaft 9 and is provided with an integral eccentric portion indicated at 12, and this element 10—12 will hereinafter be referred to as the eccentric sleeve. The eccentric sleeve 10—12 is rotatable with reference to the driven shaft 9.

A double eccentric element 13 is carried upon the eccentric portion 12 of the eccentric sleeve and is rotatable with reference thereto within certain limits as provided by a pin 14 carried in the double eccentric 13 and extending into a slot 15 in the eccentric part 12 of the eccentric sleeve. This double eccentric 13 is composed of two integral similar cylindrical portions that are oppositely and equally eccentric with reference to the driven shaft 9.

An internal gear 16 is journalled upon one of these cylindrical portions of the double eccentric element 13, and a spur gear 17 having a square hub 18 is journalled on the other cylindrical portion of the double eccentric element 13, in a position to mesh with the internal gear 16.

A hollow rectangular member 19 is slidably fitted upon the square hub 18 of the gear 17. This hollow rectangular member 19 approximately fits the square hub 18, across its shorter internal dimension and is free to slide upon said hub 18 in the direction of its longer dimension. Externally, the rectangular member 19 fits between chord-like driven surfaces 20 of a driven disk 21 having a hub 22 and which is journalled upon a concentric portion of the eccentric sleeve 10—12.

A retaining collar 23 is securely attached to a concentric portion of the eccentric sleeve 10—12 adjacent one end thereof, and a second retaining collar 24 is securely attached to the eccentric sleeve 10—12 adjacent the other end thereof and thus the various components carried upon said eccentric sleeve 10—12 are held in their cooperative relationship.

Carried upon the driven shaft 9 adjacent where it projects through the eccentric sleeve 10—12 opposite the power input end thereof, is a bell-shaped clutch 25 that is axially movable along a key 26 in said driven shaft 9, in a position to engage the hub 22 of the driven disk 21 when desired, as will be hereinafter explained.

When it is desired to transmit power from shaft 5 of any prime mover, to driven shaft 9, which it will be understood is in turn connected with the thing to be driven, an operator moves collar 8 away from fly wheel 6 and toward collar 23, to a position wherein driving lug 27 on said collar 8 engages driven lug 28 on collar 23, which will cause eccentric sleeve 10—12 to rotate.

As the eccentric sleeve 10—12 begins to rotate, moments of rotating force are transmitted from the eccentric portion 12 to the double eccentric 13 through the intermediary of a coil spring 29 carried upon pins 30 and 31 which are positioned respectively, in the eccentric portion 12 of the eccentric sleeve 10—12 and in the double eccentric element 13. This spring and pin assembly is conveniently housed in the extended hub 16a of the internal gear 16, a closure for which is provided by means of a flange 10a carried upon the collar 10. Thus the moments of rotating force will be transmitted from the eccentric sleeve 10—12 to the double eccentric 13 flexibly and yieldingly and the amount of relative rotation between these two components will be determined by the resistance to rotation of the double eccentric 13, which in turn will depend upon the driven load.

As the double eccentric 13 begins to rotate conjointly with the eccentric sleeve 10—12, the spur gear 17 meshing with the internal gear 16, will gyrate and rotate and rotary movement will be transmitted to the internal gear 16 because means are provided as indicated at 32, for holding the disk 21 stationary, and particularly against rotation.

Mounted upon the hub 16a of the internal gear 16 is a sprocket 33 which is provided with a ratchet-and-pawl connection with said hub, the pawl being indicated at 34. Thus when the internal gear 16 and its integral hub 16a rotate in the normal forward direction, the sprocket 33 is driven and driving force is transmitted therefrom through sprocket chain 35, flexible shaft 36, sprocket chain 37 and sprocket 37a securely mounted upon driven shaft 9, whereby said shaft 9 is rotated. The flexibility of shaft 36 is indicated by a universal joint 36a and this shaft may be suitably journalled as shown at 36b.

As the resistance to rotation of the internal gear 16 varies, in other words, as the driven load varies, the relative angular position of the eccentric portion 12 of the eccentric sleeve 10—12 will vary with reference to the double eccentric element 13, thus to vary the ratio between the prime mover and the driven shaft 9.

It is manifest that as the eccentric portion 12 of the eccentric sleeve 10—12 moves angularly with reference to the double eccentric element 13, the eccentricity that exists between the internal gear 16 and the driven shaft 9 will vary. The position illustrated in the drawing may be considered as a maximum degree of eccentricity between internal gear 16 and driven shaft 9. The pin 14 limits the relative movement between the eccentric sleeve and the double eccentric element to approximately 180°, within which range resides the entire range of variable eccentricity and therefore the entire range of variable ratio of power and speed transmission.

The portion of the double eccentric 13 upon which the spur gear 17 is journalled serves the important purpose of keeping the spur gear 17 in mesh with the internal gear 16, in all positions of the mechanism. Thus it will be seen that the double eccentric element 13 and the eccentric sleeve 10—12 perform highly important cooperative functions.

After the driven element has been set in motion through the intermediary of the variable ratio mechanism hereinbefore set forth, the operator next moves the slidable collar 8 farther toward the right as viewed in the diagrammatic Figure 1, to bring driving lug 38 on said collar 8 in contact with driven lug 39 on driven shaft 9, in which position the driving ratio between the drive shaft 5 of any prime mover and the driven shaft 9 is unity. In this position, it is obvious that the collar 23 is not receiving any power input.

The next position of the slidable collar 8 is attained by a farther sliding movement toward the right, whereby driving lug 40 on said collar 8 contacts driven lug 41 connected with hub 16a of the internal gear 16. When this position is effective, means as indicated at 42, are brought to bear upon collar 24, which in turn is secured to eccentric sleeve 10—12 on a concentric portion thereof, thus to prevent said sleeve 10—12 from rotating.

When eccentric sleeve 10—12 is prevented from rotation, moments of rotating force are transmitted from internal gear 16 through meshing spur gear 17, hub 18 and hollow rectangular member 19, to rotate driven disk 21 at a greater speed than the speed of the internal gear 16. In this position, the transmission mechanism may be considered as an overdrive.

In order to transmit this accelerated rotary movement of the driven disk 21 to the driven shaft 9, the bell clutch 25 is moved axially along its key 26 so that a notch 25a in said clutch is brought into engagement with a lug 43 on the hub 22 of said driven disk 21, thus to rotate driven shaft 9 conjointly with said driven disk 21.

When it is desired to reverse the direction of rotation of the driven shaft 9, the slidable collar 8 is positioned to drive the collar 23 to rotate eccentric sleeve 10—12, double eccentric element 13 and spur gear 17. Means are provided as indicated at 44, to hold internal gear 16 against rotation, under which circumstances disk 21 will rotate in a reverse direction, which rotation is transmitted to driven shaft 9 through the intermediary of bell clutch 25. When driven shaft 9 is rotating in a direction reverse from its normal forward direction of rotation, the sprocket 33 on the hub 16a, together with its associated transmission components 35, 36, 37 and 37a, will merely idle.

It is to be understood that where the present improved transmission mechanism is used in an automobile, for instance, conveniently accessible handles and pedals will be provided for operating the transmission from the driver's seat. However, since such handles and pedals could be arranged by anyone skilled in the art, they are not illustrated as they would appear in actual practice.

It is believed the operating principles of this invention and their embodying mechanism are now clearly disclosed, and the following claims are considered true and accurate definitions of this invention.

What I claim is:

1. Apparatus of the character disclosed, comprising a driven shaft, power-transmitting means axially slidable therealong to selected positions, means for establishing a driving connection between said sliding transmission means and a prime mover, an eccentric sleeve positioned around said driven shaft, a double eccentric element carried on the eccentric portion of said eccentric sleeve, an internal gear journalled for rotation upon a portion of the double eccentric, a spur gear having a square hub journalled on another portion of said double eccentric in a position to mesh with the internal gear, a hollow rectangular transmission member slidably surrounding said square hub, a driven disk having chord-like surfaces positioned concentrically around the driven shaft adjacent the rectangular transmission member so that said chord-like surfaces cooperate with said rectangular member, a clutch positioned for selectively transmitting rotary movement from the driven disk to the driven shaft, means for transmitting rotary movement from the internal gear to the driven shaft, flexible means for yieldingly transmitting rotary movement from the eccentric sleeve to the double eccentric element, means for selectively holding the said eccentric sleeve from rotation, means for selectively holding said driven disk from rotation, means for selectively holding said internal gear from rotation, and means carried on said sliding transmission means for selectively engaging and rotating the eccentric sleeve or the driven shaft or the internal gear according to the relative axial position of the slidable transmission means.

2. Apparatus of the character disclosed, comprising a driven shaft, power-transmitting means axially slidable therealong to selected positions, means for establishing a driving connection between said sliding transmission means and a prime mover, an eccentric sleeve positioned around said driven shaft, a double eccentric element having opposite equally eccentric portions carried on the eccentric portion of said eccentric sleeve, an internal gear journalled for rotation upon a portion of the double eccentric, a spur gear having a square hub journalled on another portion of said double eccentric in a position to mesh with the internal gear, a hollow rectangular transmission member slidably surrounding said square hub, a driven disk having chord-like surfaces positioned concentrically around the driven shaft adjacent the rectangular transmission member so that said chord-like surfaces cooperate with said rectangular member, a clutch positioned for selectively transmitting rotary movement from the driven disk to the driven shaft, means for transmitting rotary movement from the internal gear to the driven shaft, flexible means for yieldingly transmitting rotary movement from the eccentric sleeve to the double eccentric element, means for selectively holding the said eccentric sleeve from rotation, means for selectively holding said driven disk from rotation, means for selectively holding said internal gear from rotation, and means carried on said sliding transmission means for selectively engaging and rotating the eccentric sleeve or the driven shaft or the internal gear according to the relative axial position of the slidable transmission means.

3. Apparatus of the character disclosed, comprising a driven shaft, power-transmitting means axially slidable therealong to selected positions, means for establishing a driving connection between said sliding transmission means and a prime mover, an eccentric sleeve positioned around said driven shaft, a double eccentric element carried on the eccentric portion of said eccentric sleeve, an internal gear journalled for rotation upon a portion of the double eccentric, a spur gear having a hub with two parallel sides journalled on another portion of said double eccentric in a position to mesh with the internal gear, a hollow rectangular transmission member slidably surrounding said hub, a driven disk having chord-like surfaces positioned concentrically around the driven shaft adjacent the rectangular transmission member so that said chord-like surfaces cooperate with said rectangular member, a clutch positioned for selectively transmitting rotary movement from the driven disk to the driven shaft, means for transmitting rotary movement from the internal gear to the driven shaft, flexible means for yieldingly transmitting rotary movement from the eccentric sleeve to the double eccentric element, means for selectively holding the said eccentric sleeve from rotation, means for selectively holding said driven disk from rotation, means for selectively holding said internal gear from rotation, and means carried on said sliding transmission means for selectively engaging and rotating the eccentric sleeve or the driven shaft or the internal gear according to the relative axial position of the slidable transmission means.

4. Apparatus of the character disclosed, comprising a driven shaft, power-transmitting means axially slidable therealong to selected positions, means for establishing a driving connection between said sliding transmission means and a prime mover, an eccentric sleeve positioned around said driven shaft, a double eccentric element carried on the eccentric portion of said eccentric sleeve, an internal gear journalled for rotation upon a portion of the double eccentric, a spur gear having a hub with two parallel sides journalled on another portion of said double eccentric in a position to mesh with the internal gear, a hollow rectangular transmission member slidably surrounding said hub, a driven disk having chord-like surfaces positioned concentrically around the driven shaft adjacent the rectangular transmission member so that said chord-like surfaces cooperate with said rectangular member, a clutch positioned for selectively transmitting rotary movement from the driven disk to the driven shaft, means for transmitting rotary movement from the internal gear to the driven shaft, means for transmitting rotary movement from the eccentric sleeve to the double eccentric element, means for selectively holding the said eccentric sleeve from rotation, means for selectively holding said driven disk from rotation, means for selectively holding said internal gear from rotation, and means carried on said sliding transmission means for selectively engaging and rotating the eccentric sleeve or the driven shaft or the internal gear according to the relative axial position of the slidable transmission means.

5. Apparatus of the character disclosed, comprising a prime mover, a driven shaft, power-transmitting means axially slidable therealong to selected positions, means for establishing a driving connection between said sliding transmission means and the prime mover, an eccentric sleeve positioned around said driven shaft, a double eccentric element carried on the eccentric portion of said eccentric sleeve, an internal gear journalled for rotation upon a portion of the double eccentric, a spur gear having a hub with two parallel sides journalled on another portion of said double eccentric in a position to mesh with the internal gear, a hollow rectangular transmission member slidably surrounding said hub, a driven disk having chord-like surfaces positioned concentrically around the driven shaft adjacent the rectangular transmission member so that said chord-like surfaces cooperate with said rectangular member, a clutch positioned for selectively transmitting rotary movement from the driven disk to the driven shaft, means for transmitting rotary movement from the internal gear to the driven shaft, flexible means for yieldingly transmitting rotary movement from the eccentric sleeve to the double eccentric element, means for selectively holding the said eccentric sleeve from rotation, means for selectively holding said driven disk from rotation, means for selectively holding said internal gear from rotation, and means carried on said sliding transmission means for selectively engaging and rotating the eccentric sleeve or the driven shaft or the internal gear according to the relative axial position of the slidable transmission means.

6. Apparatus of the character disclosed, comprising a driven shaft, power-transmitting means axially slidable therealong to selected positions, means for establishing a driving connection between said sliding transmission means and a prime mover, an eccentric sleeve positioned around said driven shaft, a double eccentric element carried on the eccentric portion of said eccentric sleeve, an internal gear journalled for rotation upon a portion of the double eccentric, a spur gear having a hub with two parallel sides journalled on another portion of said double eccentric in a position to mesh with the internal gear, a hollow rectangular transmission member slidably surrounding said hub, a driven disk having parallel surfaces positioned concentrically around the driven shaft adjacent the rectangular transmission member so that said parallel surfaces cooperate with said rectangular member, a clutch positioned for selectively transmitting rotary movement from the driven disk to the driven shaft, means for transmitting rotary movement from the internal gear to the driven shaft, flexible means for yieldingly transmitting rotary movement from the eccentric sleeve to the double eccentric element, means for selectively holding the said eccentric sleeve from rotation, means for selectively holding said driven disk from rotation, means for selectively holding said internal gear from rotation, and means carried on said sliding transmission means for selectively engaging and rotating the eccentric sleeve or the driven shaft or the internal gear according to the relative axial position of the slidable transmission means.

7. In apparatus of the character disclosed, the improvement which comprises a driven shaft, an eccentric sleeve rotatably positioned on said shaft, a symmetrically opposite double eccentric carried on the sleeve and angularly movable with reference thereto, an internal gear journaled on one portion of said eccentric, and a spur gear journaled on the opposite portion of the eccentric in a position to mesh with said internal gear.

8. In apparatus of the character disclosed, the improvement which comprises a driven shaft, an eccentric sleeve having an eccentric portion and a concentric portion rotatably positioned around said shaft, a double eccentric element carried upon the eccentric portion of said sleeve, and angularly movable with reference thereto, and means for limiting such relative angular movement.

9. In apparatus of the character disclosed, the improvement which comprises a driven shaft, an eccentric sleeve having an eccentric portion and a concentric portion positioned around said shaft, a double eccentric element carried upon the eccentric portion of said sleeve, and flexible power-transmitting means connecting said sleeve with said double eccentric element.

10. In apparatus of the character disclosed, the improvement which comprises a driven shaft, an eccentric sleeve having an eccentric portion and a concentric portion positioned around said shaft, a double eccentric element carried upon the eccentric portion of said sleeve, and resilient power-transmitting means connecting said sleeve with said double eccentric element.

11. In apparatus of the character disclosed, a driven shaft, an eccentric sleeve having an eccentric portion and a concentric portion positioned around said shaft, a double equally opposite eccentric element carried upon the eccentric portion of said sleeve, and resilient means for yieldingly transmitting rotary movement from the eccentric sleeve to the double eccentric element.

FRANCIS L. ORR.